United States Patent
Meyer et al.

(10) Patent No.: US 11,429,714 B2
(45) Date of Patent: Aug. 30, 2022

(54) CENTRALIZED PRIVACY MANAGEMENT SYSTEM FOR AUTOMATIC MONITORING AND HANDLING OF PERSONAL DATA ACROSS DATA SYSTEM PLATFORMS

(71) Applicant: salesforce.com, inc., San Francisco, CA (US)

(72) Inventors: Christian Meyer, Weimar (DE); Chris Lawrence, Worcester, MA (US)

(73) Assignee: salesforce.com, inc., San Francisco, CA (US)

( * ) Notice: Subject to any disclaimer, the term of this patent is extended or adjusted under 35 U.S.C. 154(b) by 746 days.

(21) Appl. No.: 16/299,851

(22) Filed: Mar. 12, 2019

(65) Prior Publication Data
US 2020/0293651 A1    Sep. 17, 2020

(51) Int. Cl.
| | | |
|---|---|---|
| *G06F 21/62* | (2013.01) | |
| *G06F 21/55* | (2013.01) | |
| *G06N 3/04* | (2006.01) | |
| *G06K 9/62* | (2022.01) | |
| *G06N 3/08* | (2006.01) | |
| *G06F 9/54* | (2006.01) | |

(52) U.S. Cl.
CPC ............ *G06F 21/552* (2013.01); *G06F 9/542* (2013.01); *G06F 21/6245* (2013.01); *G06K 9/627* (2013.01); *G06N 3/04* (2013.01); *G06N 3/08* (2013.01)

(58) Field of Classification Search
CPC .. G06F 21/552; G06F 21/6245; G06F 21/577; G06F 9/542; G06F 2221/034; G06K 9/627; G06N 3/04; G06N 3/05
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| (Continued) | | |

OTHER PUBLICATIONS salesforce.com, Inc., Managing Expiring Credit Cards, Webpage—https://help.salesforce.com/articleView?id=blng_expiring_credit_cards.htm&type=5, date omitted.

*Primary Examiner* — Lynn D Feild
*Assistant Examiner* — Abdullah Almamun
(74) *Attorney, Agent, or Firm* — LKGlobal | Lorenz & Kopf, LLP

(57) ABSTRACT

A method of operating a privacy management system for managing personal data includes receiving a first input indicative of a first user activity in accessing personal data stored within a memory element. The method also includes creating an activity model based on the first input. The activity model is indicative of typical activity in accessing personal data stored in the memory element. The method further includes receiving a second input indicative of a second user activity in accessing personal data stored within the memory element. Also, the method includes recognizing, according to the activity model, the second user activity as being anomalous to the typical activity in accessing personal data stored in the memory element. Moreover, the method includes generating, as a result of recognizing the second user activity as being anomalous, a command that causes at least one of the client devices to perform an anomaly corrective action.

14 Claims, 4 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B2 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,673,880 B1* | 6/2020 | Pratt .................... H04L 63/1425 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah et al. |
| 2012/0233137 A1 | 9/2012 | Jakobsen et al. |
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0247216 A1 | 9/2013 | Cinarkaya et al. |
| 2016/0335405 A1* | 11/2016 | Perunov ................ G06N 20/00 |
| 2017/0155686 A1* | 6/2017 | Yanacek .............. H04L 63/0815 |
| 2018/0107962 A1* | 4/2018 | Lundin ............ G06Q 10/06398 |
| 2018/0191759 A1* | 7/2018 | Baijal ..................... G06F 30/20 |
| 2019/0347666 A1* | 11/2019 | Bermudez-Cisneros .................... G06Q 20/401 |

(56) References Cited

U.S. PATENT DOCUMENTS

2020/0242466 A1\* 7/2020 Mohassel ............ G06F 21/6254
2020/0259852 A1\* 8/2020 Wolff ...................... H04L 67/10
2020/0272740 A1\* 8/2020 Obee ..................... G06F 21/577

\* cited by examiner

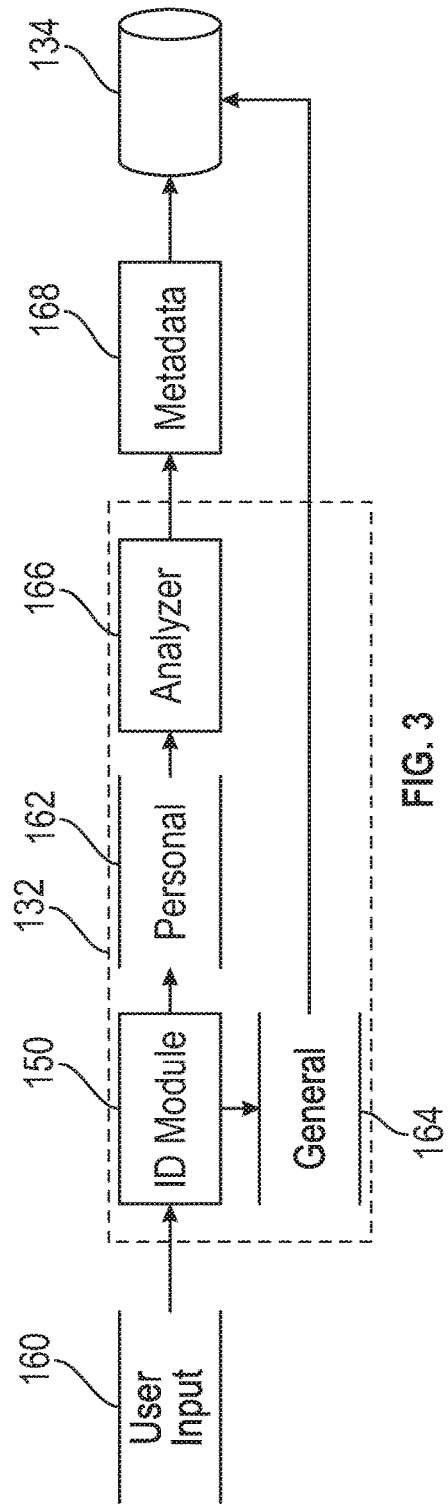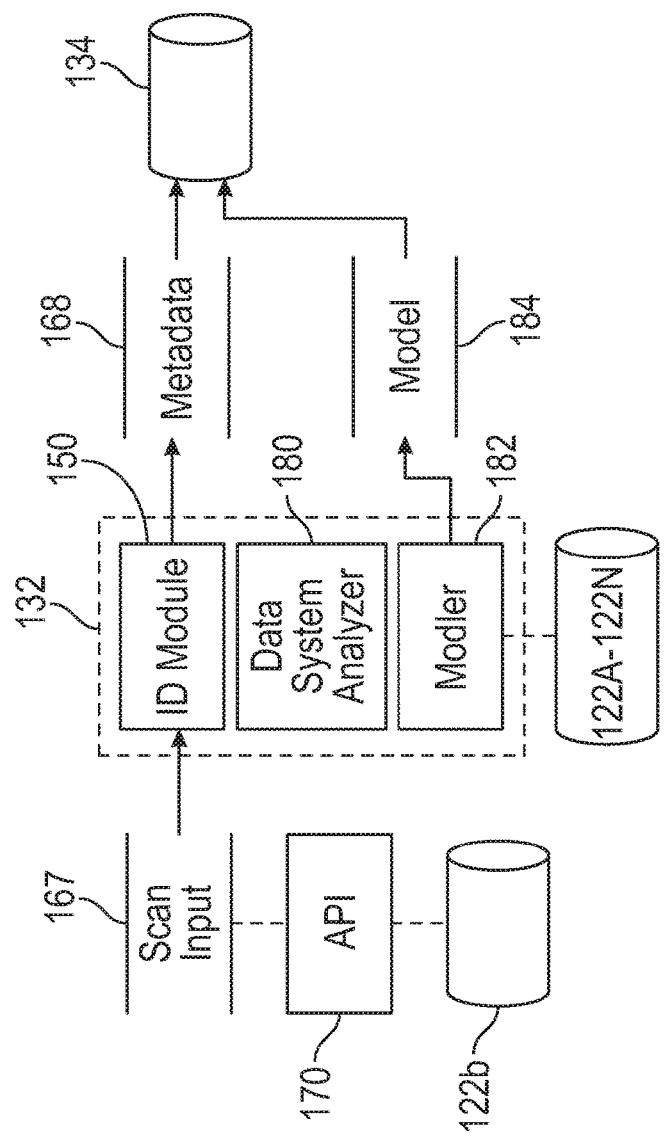

CENTRALIZED PRIVACY MANAGEMENT SYSTEM FOR AUTOMATIC MONITORING AND HANDLING OF PERSONAL DATA ACROSS DATA SYSTEM PLATFORMS

TECHNICAL FIELD

The present disclosure generally relates to a computerized privacy management system and, more particularly, relates to a centralized privacy management system for automatically monitoring and handling of personal data across a plurality of platforms.

BACKGROUND

Many types of commercial businesses and other enterprises collect personal data of human users. The personal data may be information relating to an individual that can be used to identify a person, locate a person, or otherwise. The personal data may relate to an individual's private, professional, or public life. It may be the individual's name, a home address, a photo, an email address, bank details, posts on social networking websites, medical information, an IP address of the user's device, etc.

Managing personal data is important. For example, business enterprises have incentive to protect their customers' identifying data in order to maintain good customer relationships. Furthermore, data protection regulations (e.g., the General Data Protection Regulation (EU) 20116/679, the California Consumer Privacy Act of 2018, etc.) dictate how personal data is to be managed and noncompliance can trigger various penalties.

However, management of personal data using existing systems may be difficult and time consuming, inefficient, or otherwise problematic. There may a large amount of data that is collected and stored, and this data is oftentimes managed manually. Data may be stored across different systems with different software platforms, which further increases complexity in data management.

Accordingly, it is desirable to provide a personal data management system and methodology for managing personal data of individual users of the system. Such systems and methods may facilitate the duties of a data management officer and/or facilitate interactions with users providing the personal information. Improved systems, methodologies, and other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is a data flow diagram illustrating the method of FIG. 2 according to example embodiments;

FIG. 4 is a data flow diagram illustrating the method of FIG. 2 according to additional example embodiments;

DETAILED DESCRIPTION

Figure 1:
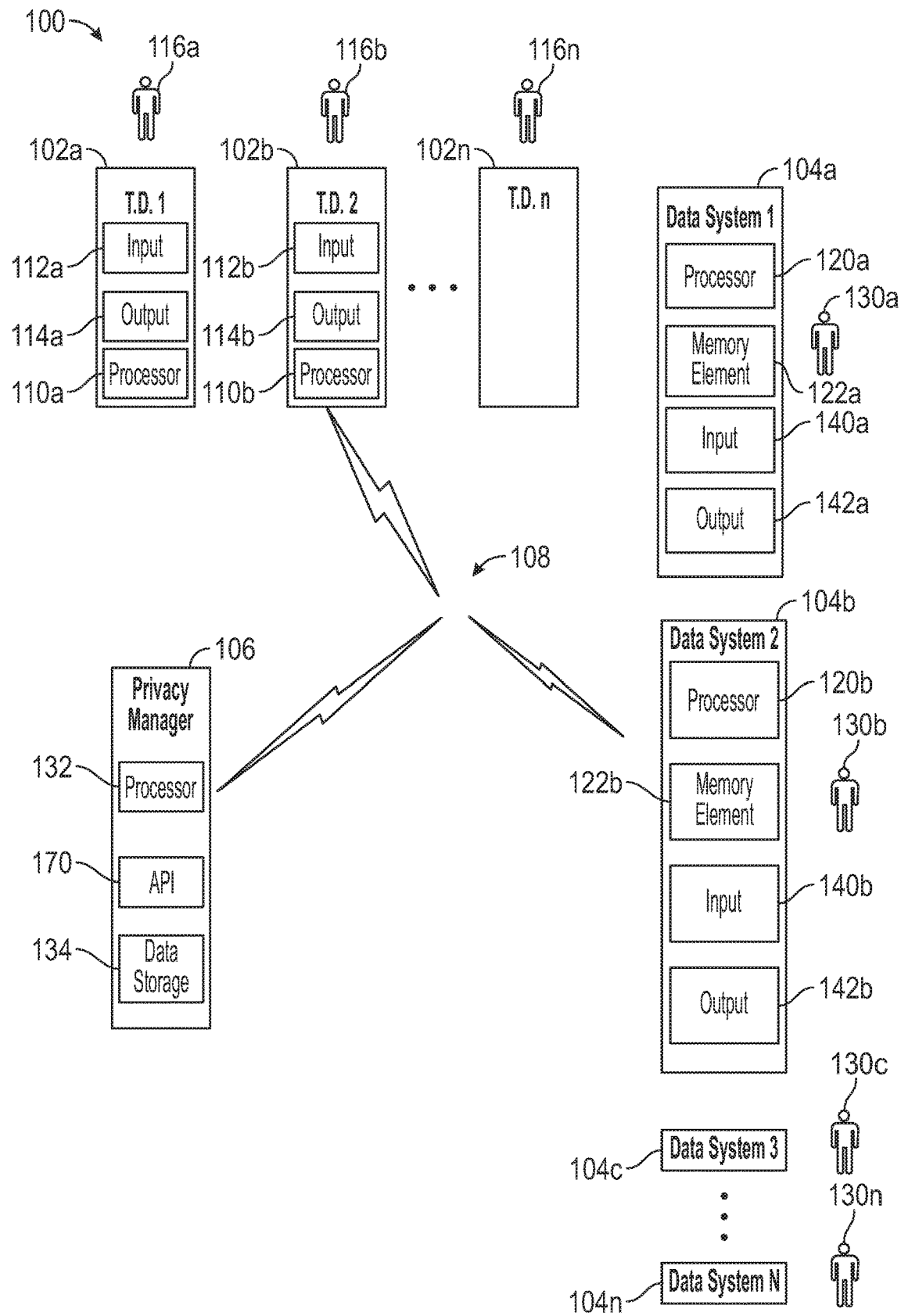
FIG. 1 is a simplified schematic representation of an exemplary computerized system, which includes a privacy management system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the television system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure When implemented in software or firmware, various elements of the systems described herein can be realized using code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Embodiments of the subject matter described herein generally relate to methods and systems for managing users' personal data. The system may include a centralized privacy management system that communicates with various client devices to collect, store, export, and/or otherwise manage the personal data communicated within the system. In some embodiments, various activities can be automatically performed to increase convenience and accuracy. Additionally, in some embodiments, the privacy management system may employ artificial intelligence and machine learning for managing personal data, for monitoring users' activity, etc. As such, the privacy management system may provide a high degree of security over stored personal data, may provide convenience, and/or may facilitate compliance with personal data regulations.

Referring initially to FIG. 1, a simplified schematic representation of a computerized system 100 is illustrated according to example embodiments of the present disclosure. Generally, the system 100 may include a centralized privacy management system 106, which communicates with a plurality of client devices via a computerized network 108. In the illustrated embodiment, the client devices of the centralized privacy management system 106 include a plurality of user terminal devices 102a-102n and a plurality of data systems 104a-104n (i.e., client data systems or remote data systems). As will be discussed, the privacy management system 106 facilitates storage, export, and other management issues relating to personal data. In some embodiments to be discussed, personal data is entered into the system 100 using one or more of the user terminal devices 102a-102n, and the personal data is electronically stored at one or more of the data systems 104a-104n. The privacy management system 106 manages this personal data in a secure, effective, convenient, or otherwise advantageous manner.

It will be appreciated that the system 100 may be useful for managing a wide variety of personal data. For example, the system 100 may be used for managing information that relates to an individual. More specifically, the personal information may be useful for identifying a person, revealing private details about the person, locating a person, and/or other purposes. As will be discussed, the system 100 may be used for managing records of an individual's name, home address, photos, email addresses, bank details, posts on social networking websites, medical information, an IP address of the user's device, or otherwise.

One or more of the terminal devices 102a-102n may be a personal computer, smart phone, tablet device, television, home appliance, and/or other device. There may be any number of terminal devices 102a-102n included within the system 100. An example terminal device 102b is illustrated in detail in FIG. 1 and may be representative of others within the system 100. As shown, the terminal device 102b may include a control system with a processor 110 configured to run a respective operating system. The terminal device 102b may also include an input device 112, such as a keyboard, a computer mouse, etc. The terminal device 102b may further include an output device 114, such as a display screen, a printer, an audio speaker, etc. A human user 116b may enter data using the input device 112, and this data may be transferred via the network 108 to one or more of the data systems 104a-104n. Furthermore, in some embodiments, stored data may be transferred from one or more of the data systems 104a-104n to one or more of the terminal devices 102a-102n, and the output device(s) 114 may provide the user 116b with corresponding output (e.g., display of the personal data on a computer screen, a printed hard copy of the personal data, etc.).

In some embodiments, at least one terminal device 102a-102n may operate in the context of a native application running on a local operating system. However, the subject matter of the present disclosure is not necessarily limited as such. In practice, the present disclosure may be implemented in an equivalent manner in any number of different application systems, on-demand systems, cloud computing systems, and the like.

Additionally, there may be any number of data systems 104a-104n of a variety of types. The data systems 104a-104n may be individual computerized systems and may be implemented with computer hardware. In some embodiments, the data systems 104a-104n may utilize computer data (including personal data provided from one or more terminal devices 102a-102n) for commerce, for conducting customer relation activities, for call center activities, for compiling survey data, or otherwise.

Two example data systems 104a, 104b are illustrated in detail in FIG. 1 and may be representative of others within the system 100. The data system 104a may have a respective control system with a processor 120a and one or more associated memory elements 122a. Likewise, the data system 104b may have a respective control system with a processor 120b and one or more associated memory elements 122b.

The processors 120a, 120b may be of various types. The processors 120a, 120b may be chosen from a central processing unit (CPU), a graphical processing unit (GPU), a field programmable gate array (FPGA), a microcontroller, an application specific integrated circuit (ASIC), or any other logic device or combination thereof. The processor 120a may execute non-transitory computer-executable instructions stored in the memory element 122a, and the processor 120b may execute non-transitory computer executable instructions stored in the memory element 122b. Execution of the instructions may cause the processors 120, 120b to perform various operations. The processors 120a, 120b (as well as processors of the other data systems 104c-104n) may operate independent of each other. In other embodiments, one or more processors may operate together with one processor providing data to another for processing and for ultimately providing functionality for the system 100.

The memory elements 122a, 122b (as well as any other memory elements of the other data systems 104c-104n of the system 100) can be implemented with any combination of volatile and non-volatile memory. The memory element 122a may include non-transitory computer-executable instructions stored thereon, wherein the instructions are configurable to be executed by the processor 120a, as needed. Likewise, the memory element 122b may include non-transitory computer-executable instructions stored thereon, wherein the instructions are configurable to be executed by the processor 120b, as needed. The memory elements 122a, 122b (as well as may store thereon any type of software, data, or other information. Although FIG. 1 shows only one memory element 122a, 122b per data system, it will be appreciated that the data systems 104a-104n may include any number of memory elements. Also, the memory elements 122a, 122b may be either locally or remotely accessible. The memory elements 122a, 122b (as well as memory elements of the other data systems 104c-104n) may operate independent of each other. In other embodiments, one or more memory elements may operate together with one element providing data to another element for storage and for ultimately providing functionality for the system 100.

The data systems 104a-104n may further include a respective input device 140a-140n, such as a keyboard, a computer mouse, etc. Also, the data systems 104a-104n may include a respective output device 142a-142n, such as a display screen, a printer, an audio speaker, etc.

During operation of the system 100, one or more data systems 104a-104n may receive data (including personal data of the users 116a-116n) from one or more terminal devices 102a-102n. As an example, the processor 120a may receive data that was initially input into the system 100 from the terminal device 102a. The data system 104a may save at least some of this data within the memory element 122a. This process may include pseudonymization, consolidation, and/or tokenization of the data stored on the memory element 122a. The data system 104a may also form data structures, database objects, etc. that are stored on the memory element 122a. Similarly, the processor 120b may process data from one or more of the terminal devices 102a-102n and may save data within the memory element 122b.

In some embodiments, the different data systems 104a-104n may have an affiliated data control officer 130a-130n. The data control officer 130a may be a person with authorization to access and manage the memory element 122a, the data control officer 130b may be authorized to access/manage the memory element 122b, and so on for the other data control officers 130c-130n. Although only one is shown per data system 104a-104n, there may be any number of data control officers 130a-130n having exclusive rights to access/manage/edit data stored within one of the memory elements 122a-122n.

The data systems 104a-104n may operate independent of each other. In these embodiments, the data systems 104a-104n may be embodied as separate business entities (e.g., different retailers). In other embodiments, two or more of the data systems 104a-104n may operate in a coordinated fashion and/or may be configured in a relational database management system. For example, the data system 104a may represent a retailer and the data system 104b may represent a call center for that retailer wherein data may be shared between the two memory elements 122a, 122b. In either case, the different data systems 104a-104n may operate on different platforms with different operating systems, hardware, etc. Furthermore, in these various examples, the data control officer 130a may be authorized to access/manage the memory element 122a and may be denied access to the other memory elements 122b-122n. Similarly, the other data control officers 130b-130n may be authorized to access/manage their respective memory element 122b-122n and may be denied access to the others.

Some of the data stored by the data systems 104a-104n may include personal data that is associated with one or more users 116a-116n. This personal data may include a user's name, home address, photo, email address, bank account information, posts on social networking websites, medical information, an IP address of the user's device, etc. The privacy management system 106 facilitates management of this personal data and ensures that the system 100 accurately manages this personal data.

The privacy management system 106 may be a computerized system with a controller having a processor 132. In some embodiments, the privacy management system 106 also includes one or more data storage devices 134.

The processor 132 may be of various types, such as a CPU, GPU, FPGA, a microcontroller, an ASIC, or any other logic device or combination thereof. The processor 132 may execute non-transitory computer-executable instructions stored in the data storage device 134, and the processor 132 may execute non-transitory computer executable instructions stored in the data storage device 134. Execution of the instructions may cause the processor 132 to perform various operations.

The data storage device 134 can be implemented with any combination of volatile and non-volatile memory. The data storage device 134 may include non-transitory computer-executable instructions stored thereon, wherein the instructions are configurable to be executed by the processor 132 as needed. Likewise, the data storage device 134 may include non-transitory computer-executable instructions stored thereon, wherein the instructions are configurable to be executed by the processor 132, as needed. Although FIG. 1 shows only one data storage device 134, it will be appreciated that the privacy management system 106 may include any number of data storage devices 134, either locally or remotely accessible.

The privacy management system 106 enables centralized computing, at least, with respect to personal data of the users 116. Accordingly, the privacy management system 106 may be configured as a central server and a substantial amount of the processing/computing of personal data may be performed by the processor 132 in cooperation with the data storage device 134. The privacy management system 106, in turn, may be responsible for delivering application logic, processing and providing computing resources to the terminal devices 102a-102n and/or to the data systems 104a-104n regarding the management of the personal data stored on the memory elements 122a-122n.

Generally, the privacy management system 106 may be used to identify personal data of users 116a-116n. The system 106 may monitor data as it is communicated through the system 100 and identify the personal data contained therein. In other words, the privacy management system 106 may distinguish personal data from other types of data. The system 106 may also be configured to analyze previously stored data, data structures, data management programming, code, and the like to identify personal data therein. The privacy management system 106 may flag the personal data and record other information about the identified personal data. In some embodiments, the privacy management system 106 provides a map, key, or other type of guide to personal data that is saved throughout the memory devices 122a-122n of the data systems 104a-104n.

It will be appreciated that the different data systems 104a-104n may have different platforms, different data formats, different operating systems, etc. In some embodiments, the processor 132 may communicate with the data system 104a via an application program interface (API) module 170. The API module 170 may include a set of subroutine definitions, communication protocols, and tools for communicating with the different data systems 104a-104n.

Also, the privacy management system 106 may be configured with machine learning, and the privacy management system 106 may learn characteristics of the system 100 and how personal data moves therein, detect anomalous activity with regard to personal data, and more. The privacy management system 106 may automatically generate auditing information for the users 116a-116n and/or the data control officers 130a-130n. The system 106 may also be configured for automatically alerting data control officers 130a-130n of data management risks, of anomalous activity, and the like. Using the privacy management system 106, personal data may be managed consistently, accurately, and efficiently for the users 116a-116n and/or the data control officers 130a-130n.

Figure 2:
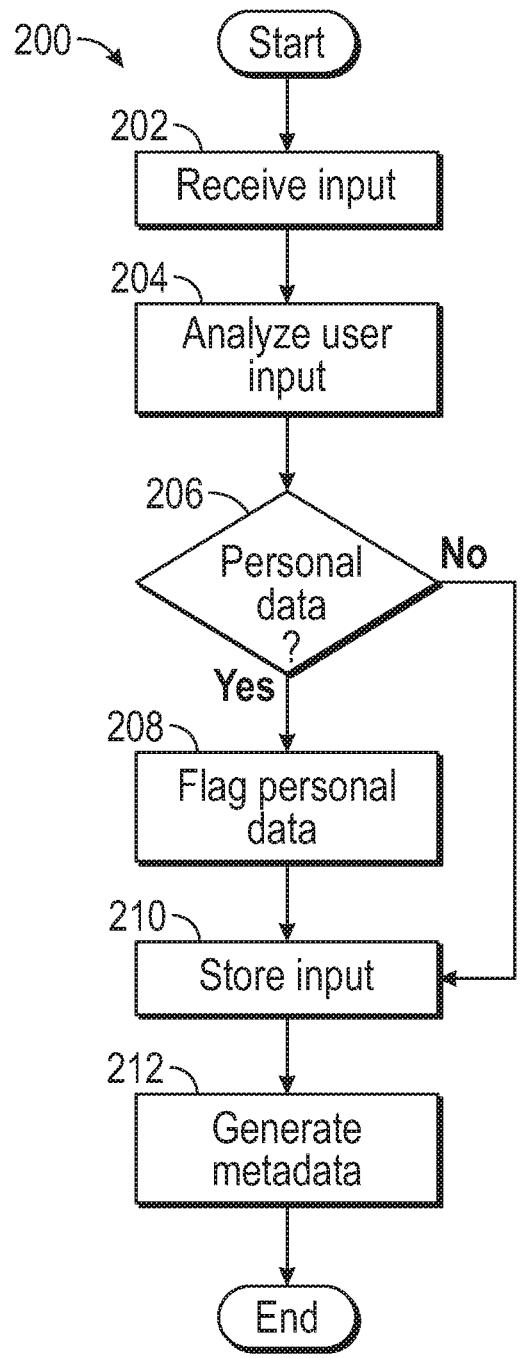
FIG. 2 is a flowchart illustrating a method of operating the privacy management system.

Referring now to FIGS. 2 and 3, a method 200 of operating the privacy management system 106 will be discussed according to example embodiments. As shown in FIG. 2, the method 200 may begin at 202, wherein the processor 132 of the privacy management system 106 receives data input.

In some embodiments, the ID module 150 may receive user input 160 from one or more of the terminal devices 102a-102n. For example, the user 116b may enter information (i.e., the user input 160) using the terminal device 102b to make a commercial transaction with a business entity.

The method 200 may continue at 204, wherein the processor 132 analyzes the input 160. As shown in FIG. 3, for example, the processor 132 may include an ID module 150 that receives the data input 160. Then, at 206 of the method 200, the ID module 150 may identify and/or distinguish personal data 162 within the input 160 from other general data 164 (nonidentifying data) within the input 160. The ID module 150 may be configured to execute instructions that support a personal data identification technique. Using the personal data identification technique, the ID module 150 of the processor 132 may process the user input 160 and differentiate personal data 162 from general data 164 contained within the input 160. For example, the ID module 150 may differentiate an email address (personal data 162) from a product order number (general data 164). In some embodiments, the ID module 150 may identify the personal data 162 using character recognition techniques (e.g., detection of the "@" symbol). In other embodiments, the ID module 150 may compare the data to one or more criteria, utilize various algorithms and/or programming logic for distinguishing between the personal data 162 and the general data 164.

Also, in some embodiments, the ID module 150 may function using artificial intelligence, such as a trained deep neural network (DNN) utilizing deep learning. Deep learning (also known as deep structured learning, hierarchical learning or deep machine learning) is a class of machine learning algorithms that use a cascade of many layers of nonlinear processing units for feature extraction and transformation. Each successive layer uses the output from the previous layer as input. The example DNN is a computing system or processing device that is made up of a number of simple, highly interconnected processing elements/devices/units referred to as neurons, which can be implemented using software algorithms and/or actual hardware. The example DNN is organized in layers that are made up of a number of interconnected neurons that work together to produce an output. In this embodiment, the DNN may be trained using numerous data sets, each containing a combination of personal data and generic data, and the DNN be trained to predict (as output) the portions of the data set that represent personal data. Using this trained DNN, the ID module 150 may be used to recognize and distinguish the personal data contained in the input 162.

If the ID module 150 finds personal data 162 (decision block 206 answered affirmatively), then at 208 of the method 200, the ID module 150 may generate an identifier or flag for that personal data 162. The general data 164 may remain unflagged.

Next, at 210, the processor 132 may communicate with one or more of the data systems 104a-104n (e.g., via the API module 170) for storing the user input 160 in computerized memory. In one example, the processor 132 communicates instructions to the processor 120a for saving the flagged personal data 162 and the unflagged general data 164 on the memory element 122a of the data system 104a. This process may include pseudonymization, consolidation, and/or tokenization of the personal data 162 saved at the data system 104a.

Also, at 212 of the method 200, the processor 132 of the privacy management system 106 may generate metadata 168 relating to the personal data 162. The metadata 168 may indicate characteristics of the personal data 162. For example, the metadata 168 may indicate the storage location where the personal data 162 is stored and/or other auditing information. In the present example, the metadata 168 would indicate that the personal data 162 is stored in the memory element 122a. The metadata 168 may also indicate data structures, programming logic, etc. used for filing in that location. Furthermore, the metadata 168 may indicate a storage time of the personal data (i.e., the time that the personal data 162 was saved, when it was updated, when it was accessed). Furthermore, in some embodiments, the metadata 168 may indicate which data control officer 130a-130b accessed the personal data 162. Furthermore, the metadata 168 may indicate the contents of the personal data 162, for example, by identifying whether the personal data 162 is an email address versus a credit card number, etc. Moreover, in some embodiments, the metadata 168 may indicate other characteristics of the personal data 162, such as the degree of confidentiality of the personal data 162 (e.g., highly confidential or lower confidentiality), an indicator of the access privileges assigned to the personal data 162. Furthermore, in some embodiments, the metadata 168 may include other indicators, such as user consent with regard to the handling of personal data 162 within the system 100.

In some embodiments, the processor 132 may save the metadata 168 at the data storage device 134 of the privacy management system 106. This metadata 168 may be accessed and utilized for various purposes to be discussed in greater detail below. Once the personal data 162 and general data 164 is saved at the data system 104a and the metadata 168 has been saved at the privacy management system 106, the method 200 may terminate.

As shown in FIGS. 2 and 4, the method 200 may also be used for identifying and analyzing personal data 162 that has been previously stored at one of the memory elements 122a-122n. For example, at 202 of the method, the privacy management system 106 may communicate with the data system 104b (via the API module 170) and scan the memory element 122b for previously stored personal data. This is illustrated in FIG. 4 as the ID module 150 of the processor 132 receiving scan input 167 from the memory element 122b. In some embodiments, the ID module 150 may process the scan input 167, and (at 206) the ID module 150 may differentiate the personal data 162 from the general data 164. Next, at 208 of the method 200, the personal data 162 may be flagged. Subsequently, in some embodiments, the personal data 162 may be re-saved at the memory element 122b along with the flag generated at 208. The processor 132 may generate the metadata 168 at 212, and the metadata 168 may be saved at the data storage device 134. Then, the method 200 may terminate.

In additional embodiments represented in FIG. 4, the processor 132 may further include a data system analysis module 180 configured to execute instructions that support a data system analysis technique. The data analysis technique may be used for analyzing one or more of the data systems 104a-104n to determine characteristics of the system with regard to stored personal data 162. The metadata 168 as described above may be generated according to this analysis. As an example, the data system analysis module 180 may determine where personal data 162 is stored on the memory element 122b, when it was stored and/or modified, and other details. The data system analysis module 180 may also determine how personal data 162 is stored on the memory element 122b, including determining how the personal data 162 is pseudonymized, consolidated, and/or tokenized on the memory element 122b. The module 180 may discover where personal data 162 is located based on where new data gets filed in some embodiments. Furthermore, the module 180 may determine the number of data objects that typically contain personal data 162. The data system analysis module 180 may also execute instructions for detecting personal data 162 that is unintentionally stored and/or stored in unexpected locations (e.g., email addresses contained within a data string stored on the memory element 122b). Once the personal data 162 is identified and flagged, the processor 132 may generate and save the metadata 168 at the data storage device 134.

Furthermore, in some embodiments represented in FIG. 4, the processor 132 may include a data system modelling module 182 configured to execute instructions that support a data system modelling technique. The data system modelling technique may be used for automatically generating a model 184 reflecting the characteristics of a particular data system 104a-104n and how personal data 162 is managed therein. The modelling module 182 and/or the model 184 may employ artificial intelligence, adaptive algorithms, and machine learning to generate the model.

In some embodiments, the modelling module 182 may receive and process the metadata 168 and the output from the data system analysis module 180, and the module 182 may in turn generate a model characterizing where personal data is typically stored, how it is stored (i.e., pseudonymization, consolidation, tokenization, etc.), and the like. In the embodiment of FIG. 4, the data system modelling module 182 may generate the model 184 from two or more memory elements 122a-122n such that the model 184 is reflective of a wide range of data systems 104a-104n. The model 184 may be saved at the data storage device 134. As will be discussed, the model 184 may be used for various purposes, such as detecting anomalous use, data breach, and the like.

The data system analysis module 180 and/or the modelling module 182 may employ artificial intelligence, such as a trained deep neural network (DNN) utilizing deep learning. In this embodiment, the DNN may be trained using one or more data systems. Over time, the DNN can learn to how personal data is stored within the data system. For example, the DNN can learn where the personal data is stored on the data system, the data structures used to store the personal data, the pseudonymization, consolidation, and/or tokenization techniques for the personal data, and the like. Using this trained DNN, the data system analysis module 180 may be used to recognize the characteristics of the data system.

Thus, as illustrated in FIGS. 2-4, the privacy management system 106 may be used for managing personal data 162 as it is entered into, saved on, and organized within the system (FIG. 3). Also, the privacy management system 106 may be used for analyzing data systems 104a-104n having previously stored personal data 162 (FIG. 4). As described above, the privacy management system 106 may generate and save detailed and useful metadata 168 for continuing management of the privacy data 162.

Figure 5:
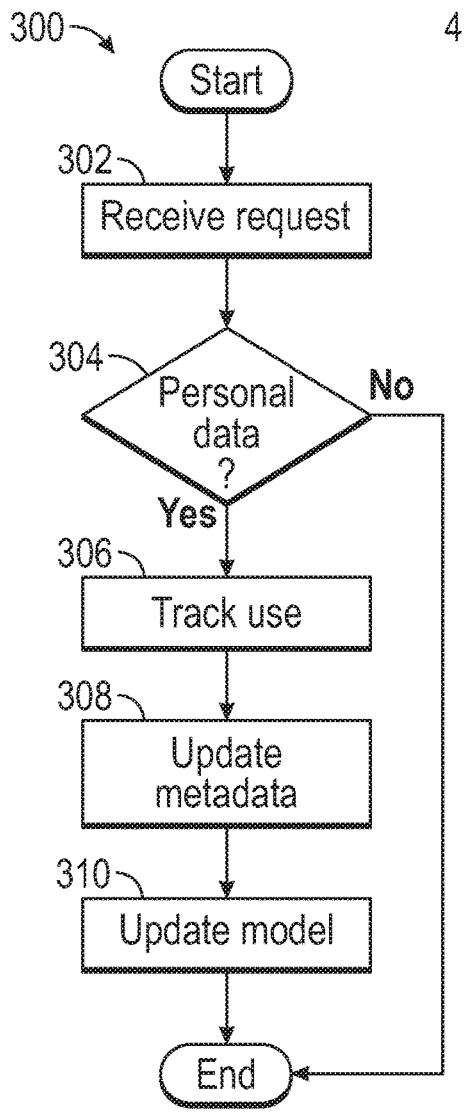
FIG. 5 is a flowchart illustrating a method of operating the privacy management system according to additional embodiments.

For example, FIG. 5 illustrates a method 300 of managing personal data 162 within the system 100. The method 300 may begin at 302, wherein a request is received (e.g., at one of the processors of the data systems 104a-104n) for taking some action. For purposes of discussion, it will be assumed that at 302, the data control officer 134a attempts to access personal data 162 stored at the memory element 122a. In some embodiments, before taking such action, the processor 120a at the data system 104a may communicate with the processor 132 at the privacy management system 106 to determine whether the action affects personal data 162 stored at the memory element 122a. Specifically, at 304 of the method, the processor 132 may access the metadata 168 saved at the data storage device 134 and determine whether the action affects any personal data 162 stored at the data system 104a. In additional embodiments, the personal data 162 saved at the memory element 122a is flagged as such locally at the data system 104a; therefore, an action that affects the personal data 162 automatically triggers the data system 104a to warn the privacy manager 106 of the activity. If personal data 162 is not affected (304 answered negatively), then the method 300 may terminate. However, if the action does affect personal data 162 (304 answered positively), then the method 300 may continue at 306.

At 306 of the method 300, the processor 132 may communicate with the processor 120a to track the activity requested at 302. For example, the processor 132 may record how the personal data 162 is modified, when the modification occurs, and the like. Then, at 308 of the method 300, the processor 132 may update the metadata 168 to reflect the activity tracked at 306 and save the updated metadata at the data storage device 134. Furthermore, at 310 of the method 300, the processor 132 may update the model 184 to reflect the activity tracked at 306. Then, the method 300 may terminate. This method 300 may continue to cycle such that the personal data 162 throughout the data systems 104a-104n may be tracked and the corresponding metadata 168 may be updated and monitored continuously. Likewise, the model 184 can be continuously updated to maintain high accuracy.

Accordingly, the method 300, the metadata 168, and the model 184 generated therefrom may be used to assess, understand, and characterize how personal data 162 is used within the system 100. The metadata 168 generated for the personal data 162 may be used for auditing purposes, for analyzing the data systems 104a-104n and detecting security risks or flaws, and/or for other purposes.

These features may empower the data control officers 130a-130n for more effectively managing the respective data systems 104a-104n. For example, a data control officer 130a may request the privacy management system 106 for information about the personal data 162. In some embodiments, the processor 132 may quickly and accurately categorize the personal data 162 using the metadata 168. Specifically, the personal data 162 may be categorized by usage frequency or age, which may be useful for auditing purposes, for learning how data moves through the system 100, etc. Also, the privacy management system 106 may analyze the personal data 162 according to the metadata 168 or according to custom search patterns (e.g., email addresses, government-issued identity numbers, IP addresses, names, etc.) to uncover possible security risks. Furthermore, the model 184 may be generated to reflect data objects that typically contain personal data 162.

The privacy management system 106 may additionally analyze one or more data systems 104a-104n and identify security risks to the respective data control officer 130a-130n. For example, the data system analysis module 180 may analyze logical object graphs at the data system 104a that have not been modeled and identify to the data control officer 130a (via the output device 142a) that there is a resultant security risk. Additionally, the privacy management system 106 may analyze custom data architecture and identify those that fail certain criteria (e.g., privacy-by-design criteria). For example, the data system analysis module 180 may scan data architecture and discover the same emails stored in multiple tables. As a result, the privacy management system 106 may alert the data control officer 130a-130n as to the duplication. Accordingly, data can be saved more securely. Also, the privacy management system 106 may facilitate pseudonymization of the data.

Furthermore, the privacy management system 106 may facilitate review of the security systems protecting personal data 162 stored in the memory elements 122a-122n. For example, the data control officer 130a may wish to review the security status of the memory element 122a. The data control officer 130a may use the input device 140a to send instructions to the processor 132 of the privacy management system 106. These instructions may be to find personal data 162 on the memory element 122a that meets predetermined criteria (e.g., age, export history, and/or other attributes). The processor 132 may, in turn, access the metadata 168 saved in the data storage device 134 according to the query, and the processor 132 may reply to the data system 104a with a report of the personal data 162 saved on the memory element 122a that satisfies the criteria. Based on the report, the data control officer 130a may identify and remediate possible privacy risks and initiate the deletion of outdated personal data 162.

The privacy management system 106 may also be used to generate reports and summaries of the personal data 162 saved in the system and/or reports of how the personal data 162 is modified within the data systems 104a-104n. In some embodiments, the data control officer 130a may enter a request for such a report using the input device 140a, the processor 132 may receive the request, and the processor 132 may utilize the metadata 168 to identify and categorize the personal data 162. The processor 132 may generate a corresponding report and may send the report to the data system 104a to be output using the output device 142a. The report may be presented in various ways, such as a timeline, channel visualization, user bubble charts, or otherwise. In some embodiments, the report can include historical information regarding personal data 162. For example, the report may indicate the personal data 162 that left the data system 104a, the channel through which the personal data 162 was deleted, and who requested the deletion.

Additionally, the privacy management system 106 may empower the users 116a-116n to manage their own personal data 162 within the system 100. Using the input device 112a, the user 116a may enter identifying information (e.g., an email, a loyalty number, and a name) with a request to delete all of the personal data 162 stored on the system 100. The processor 132 may receive the request and, in turn, access the metadata 168 stored on the data storage device 134 to determine the location of the personal data 162. It is assumed for purposes of discussion that the metadata 168 reveals that there is stored personal data 162 corresponding to the user 116a (e.g., a customer profile, tracking data, order history, home address, and wishlist), and some of this personal data 162 is stored on the memory element 122a and the remaining personal data 162 is stored on the memory element 122b. Thus, the processor 132 sends a request to the processor 120a to delete the personal data 162 of the user 116a from the memory element 122a and another request to the processor 120b to delete the personal data 162 of the user 116a from the memory element 122b. The processors 120a, 120b may respond to the requests by outputting instructions (via the output devices 142a, 142b) to the data control officers 130a, 130b. Using these instructions, the data control officers 130a, 130b may export, lock, delete or anonymize the personal data 162 stored on the respective memory element 122a, 122b. Then, the data systems 104a, 104b may send a reply to the privacy management system 106 reporting the actions taken. The privacy management system 106 may, in turn, send a report to the terminal device 102b. This report may be output by the output device 114b and may be a record of the personal data 162 that was affected by these actions and/or a record of its deletion, etc. Also, the processor 132 may update the metadata 168 to reflect the deletion.

Furthermore, in some embodiments, the processor 132 may automatically confirm that the personal data 162 has been deleted/locked/anonymized by sending instructions to the processors 120a, 120b to search for the data. If the searches return no data, then the deletion/locking/anonymization is confirmed. If additional personal data 162 for the user 116a is found, then the privacy management system 106 may output an alert to the corresponding data system. For example, if personal data 162 remains on the memory element 122a, then the processor 132 may send instructions to the processor 120a to output an alarm message from the output device 142a to the data control officer 130a. Accordingly, the officer 130a may take action and delete/lock/anonymize the remaining personal data 162.

Likewise, the data control officers 130a-130n may utilize the privacy management system 106 to easily gather information about a particular user 116a-116n. For example, the data control officer 130a may enter a query (using the input device 140a) for personal data 162 relating to the user 116b. The query may be sent to the processor 132, which may, in turn, access the metadata 138 to find the personal data 162 matching the query. (It is assumed that the memory elements 122a, 122b both include some personal data 162.) Using this information, the processor 132 may generate and send one or more reports about this personal data 162. The report(s) may be sent to the data system 104a and may be output (printed, displayed, etc.) by the output device 142a.

Also, the privacy management system 106 may allow data control officers 130a-130n to delete personal data 162 according to predetermined criteria (e.g., inactive customers, outdated payment information, and the like). For example, the data control officer 130a-130n may enter a query (using the input device 140a) for outdated personal data 162 stored on the memory element 122a. Specifically, the query may be a search for any and all expired credit card numbers stored on the memory element 122a. The query may be sent by the data system 104a and received by the processor 132 of the privacy management system 106. The processor 132 may, in turn, access the metadata 138 to find the personal data 162 matching the query. In some embodiments, the processor 132 may generate and send commands to the processor 120a, and the processor 120 may, in turn, automatically delete the indicated personal data 162 from the memory element 122a.

Figure 6:
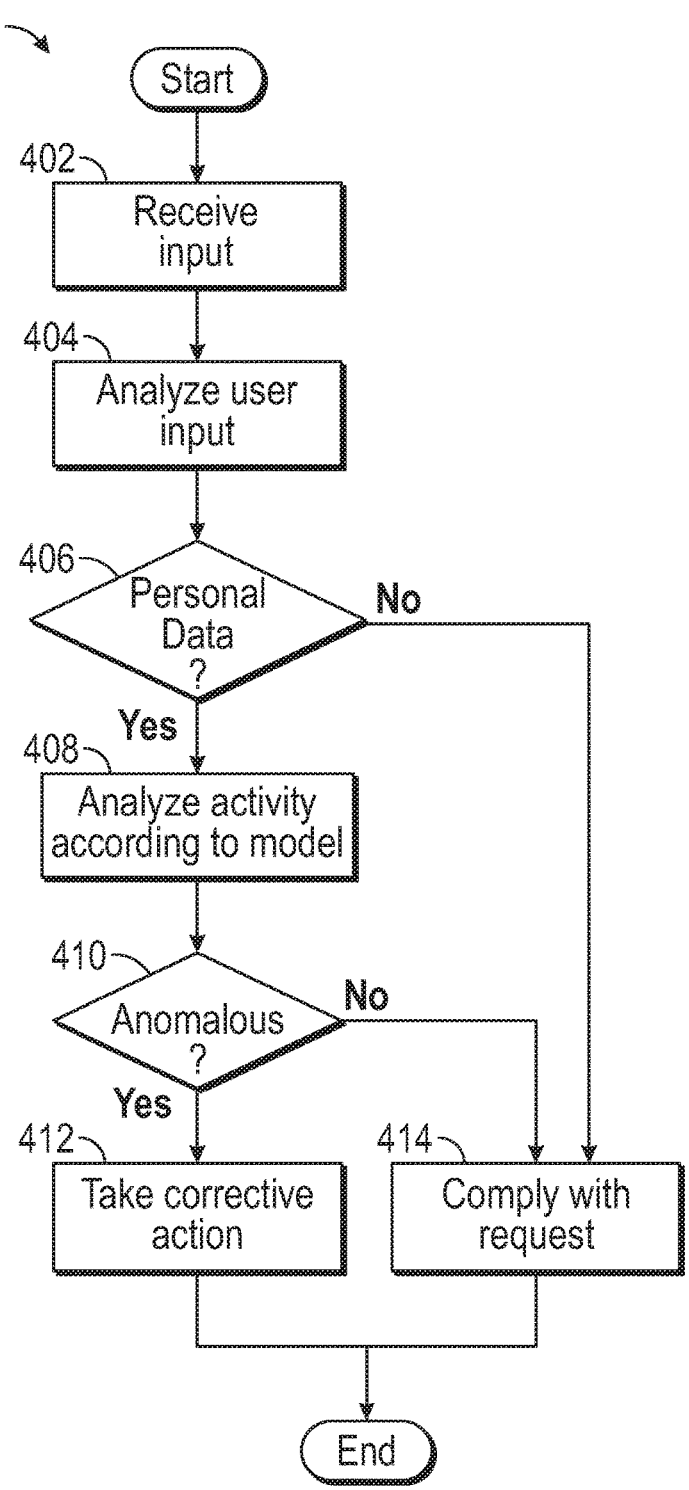
FIG. 6 is a flowchart illustrating a method of operating the privacy management system according to additional embodiments.

Referring now to FIGS. 4-6 the data system modelling module 182 and the model 184 produced therefrom will be discussed in greater detail. As discussed, the data system modelling module 182 may be configured to generate and update the model 184 reflecting the characteristics of one or more of the data system 104a-104n and how personal data 162 is stored therein. The model 184 may also be used in a method 400 (FIG. 6) for monitoring the system 100, detecting anomalous use of the personal data 162 and/or data breach, alerting clients as to such activity, and taking steps to correct such activity.

As mentioned above, the model 184 may comprise a trained deep neural network (DNN) utilizing deep learning. Also, as discussed in relation to FIG. 4, the data system modelling module 182 may train the model 184 by scanning the data systems 104a-104n (i.e., by processing the scan input 167). Furthermore, according to the method 300 of FIG. 5, the privacy management system 106 may track activity that affects personal data 162, and at 310 of the method 300, the model 184 may be updated according to client activity. Accordingly, the model 184 may be trained to reflect how the data systems 104a-104n are typically used. In other words, the model 184 may be considered an activity model that indicates how one of the data system 104a-104n is typically used. Also, the model 184 may identify typical usage patterns affecting stored personal data 162. For example, the model 184 may reflect what personal data 162 is typically accessed, when it is typically accessed, which client devices typically access the personal data 162, and/or other usage characteristics. It will be appreciated that the model 184 may correspond to a single data system 104a-104n and may be tailored for monitoring the same. Otherwise, the model 184 may be more generic and may represent typical data structures and/or typical usage habits for a plurality of the data systems 104a-104n.

The model 184 may be used for monitoring use of the personal data 162 within the system 100 according to a method 400 represented in FIG. 6. The method 400 may begin at 402, wherein the processor 132 receives an input from one of the client devices (i.e., one of the terminal devices 102a-102n or data systems 104a-104n). This input may be a request for one of the processors 120a-120n to perform some action, such as to access, export, or modify data stored on one of the memory elements 122a. The input may originate from one of the users 116a-116n or from one of the data control officers 130a-130n.

The method 400 may continue at 404, wherein the processor 132 analyzes the input received at 402. In some embodiments, the processor 132 may access the metadata 168 at the data storage device 134 in processing the input received at 402 to determine whether the input 402 affects personal data 162 stored at the data systems 104a-104n.

Next, at 406, the processor 132 may determine whether or not the input received at 402 affects personal data 162. For example, if the input dictates that a stored file identified in the metadata 168 as containing personal data 162 will be accessed, then the processor 132 may output a positive determination at 406. If the processor 132 determines that no personal data 162 will be affected (negative determination at 406), then the method 400 may continue at 414, and the processor 132 may comply with the request and allow the activity before the method 400 terminates. If, however, personal data 162 will be affected (positive determination at 406), then the method 400 may continue at 408.

At 408 of the method 400, the processor 132 may analyze the activity requested at 402 according to the model 184 to determine whether the activity is anomalous. For example, the processor 132 may consider various elements of the request, such as the client device that made the request, the global location from which the request was made, the storage location of the requested personal data among the plurality of client data systems, the category of requested personal data (e.g., highly classified versus lower security material, etc.), and/or the time of day at which the request was made. The processor 132 may employ pattern recognition techniques in the analysis in an attempt to recognize typical patterns in the usage request (e.g., a known client device exporting an amount of personal data and at a time that is typical for that client device according to the model 184). The processor 132 may also calculate predictions as to the amount of data that will be exported, the memory devices that will be accessed, and/or other activities. If the processor 132 does not recognize the activity requested at 402 and/or the activities do not match predictions, then the processor 132 can determine the requested activity is anomalous.

In additional embodiments, at 408, the processor 132 may compare the actual activity requested at 402 to modeled activity reflected in the model 184. For example, the processor 132 may determine if the amount of personal data 162 affected is significantly greater than the amount of personal data typically affected. Moreover, the processor 132 may analyze the request and determine if the time of the request is significantly different than a typical request time. Furthermore, the processor 132 analyze the request and determine if the requesting client device is different from the device typically used to make the request and/or whether the requesting client device is globally located outside a region where requests are typically made. If, through these comparisons, the processor 132 determines that there is a large difference between the requested activity and the modelled activity, then the processor 132 can determine that the requested activity is anomalous. It will be appreciated that the analysis of 408 of the method 400 may be selectively adjusted. As such, the analysis may be made to be more aggressive (i.e., more activities determined to be anomalous) or less aggressive (i.e., fewer activities determined to be anomalous).

If, at 410, the processor 132 determines that activity is not anomalous according to the model 184 (negative determination at 410), then the method 400 may continue at 414, and the processor 132 may comply with the request and allow the activity before the method 400 terminates. If, however, the processor 132 determines that the activity is anomalous (affirmative determination at 410), then the method 400 may continue at 412 before the method 400 terminates.

At 412, the privacy management system 106 may take some corrective action to address the detected anomalous behavior. For example, the processor 132 may generate a command that denies the request made at 402, thereby preventing the potentially compromising activity. In additional embodiments, the processor 132 may generate a command for issuing an alert to any data system 104a-104n having personal data 162 associated with the request. The alert may be issued by the output device 142a-142n of the relevant data system(s) 104a-104n. Accordingly, the relevant data control officer 130a-130n may receive the alert and investigate the activity further, take steps to deny the request, and/or put the request on hold until proven legitimate. Also, once the alert is received, the respective data control officers 130a-130n may invalidate a password used when the activity was requested at 402 and/or require new passwords. The privacy management system 106 may also suggest to the relevant data control officer 130a-130n retention or archive settings, suggest encryption, and the like. Additionally, in some embodiments, the privacy management system 106 may automatically send a request for more information to the client device that made the initial request at 402 to determine legitimacy.

The method 400 may also be used to detect a potential breach of personal data 162 from the system. Accordingly, in some embodiments of 412 of the method 400, the privacy management system 106 may issue an alert to one or more data control officers 130a-130n. The alerted data control officer(s) 130a-130n may, in response, log out all users to prevent further activity and/or for restoring the affected data system.

Furthermore, in some embodiments of 412 of the method 400, the privacy management system 106 may issue an alert to users 116a-116n whose personal data may have been compromised. Specifically, at 412, the processor 132 may generate a command for issuing an alert to the relevant terminal device 102a-102n, and the alert may be output by the respective output device 114a-114n for informing the respective user 116a-116n. The processor 132 may also issue a command for forcing logout and/or invalidation of tokens for particular users. Subsequently, the method 400 may terminate.

Accordingly, the privacy management system 106 of the present disclosure provides useful, efficient, accurate, and secure management of personal data 162 within the system. The privacy management system may provide a high degree of security over stored personal data, may provide convenience, and/or may facilitate compliance with personal data regulations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a privacy management system for managing personal data within a plurality of client data systems, the plurality of client data systems including a first data system having a memory element, the method comprising:
   receiving a first input indicative of a first user activity in accessing personal data stored within the memory element;
   receiving a data set within the first input, differentiating personal data from general data contained within the data set, and generating metadata for the differentiated personal data;
   creating an activity model based on the first input, the activity model indicative of typical activity in accessing personal data stored in the memory element;
   receiving a second input indicative of a second user activity in accessing personal data stored within the memory element;
   accessing the generated metadata to determine whether the second user activity affects personal data;
   recognizing, according to the activity model, the second user activity as being anomalous to the typical activity in accessing personal data stored in the memory element; and
   generating, as a result of recognizing the second user activity as being anomalous, a command that causes at least one of the plurality of client devices to perform an anomaly corrective action.

2. The method of claim 1, wherein receiving the data set includes receiving a stored data set stored on the memory element, wherein generating metadata includes generating metadata that indicates a storage location of personal data on the memory element, a data structure for the personal data on the memory element, and a storage time of the personal data on the memory element.

3. The method of claim 1, wherein receiving the second input includes receiving, in the second input, at least one of:
   a first signal identifying the client device that supplied the second input;
   a second signal indicative of a global location from which the second input was supplied;
   a third signal indicative of a storage location of requested personal data among the plurality of client data systems;
   a fourth signal indicative of a category of requested personal data; and
   a fifth signal indicative of a time of day at which the second input was supplied.

4. The method of claim 3, wherein receiving the second input includes receiving each of the first, second, third, fourth, and fifth signals.

5. The method of claim 3, wherein receiving the first input includes receiving, in the first input, at least one of:
   a first signal identifying the client device that supplied the second input;
   a second signal indicative of a global location from which the second input was supplied;
   a third signal indicative of a storage location of requested personal data among the plurality of client data systems;
   a fourth signal indicative of a category of requested personal data; and
   a fifth signal indicative of a time of day at which the second input was supplied;
   wherein creating the activity model includes training a predictive data model using the at least one of the first, second, third, fourth, and fifth signals; and
   as a result of the training, outputting a trained classifier that receives as input the second input and that produces as output a prediction of whether second user activity is anomalous.

6. The method of claim 1, wherein generating the command includes generating an alert command that causes an output device of the at least one of the client devices to output an alert.

7. The method of claim 1, wherein generating the command includes generating a denial command that causes the at least one of the client devices to deny a request associated with the second user activity.

8. A centralized privacy management system for managing personal data comprising:
   a plurality of client data systems in a computerized system, the plurality of client data systems including a first data system having a memory element, the privacy management system including:
   a processor configured to communicate with the plurality of client data systems;
   the processor configured to receive a first input indicative of a first user activity in accessing personal data stored within the memory element;
   the processor programmed to receive a data set within the first input, differentiate personal data from general data contained within the data set, and generate metadata for the differentiated personal data;

the processor programmed to create an activity model based on the first input, the activity model indicative of typical activity in accessing personal data stored in the memory element;

the processor configured to receive a second input indicative of a second user activity in accessing personal data stored within the memory element;

the processor programmed to access the generated metadata to determine whether the second user activity affects personal data;

the processor programmed to recognize, according to the activity model, the second user activity as being anomalous to the typical activity in accessing personal data stored in the memory element; and the processor programmed to generate, as a result of recognizing the second user activity as being anomalous, a command that causes at least one of the plurality of client devices to perform an anomaly corrective action.

9. The system of claim 8, wherein the processor, substantially concurrent with receiving the data set stored on the memory element, is programmed to generate metadata that indicates a storage location of personal data on the memory element, a data structure for the personal data on the memory element, and a storage time of the personal data on the memory element.

10. The system of claim 8, wherein the second input includes at least one of:
a first signal identifying the client device that supplied the second input;
a second signal indicative of a global location from which the second input was supplied;
a third signal indicative of a storage location of requested personal data among the plurality of client data systems;
a fourth signal indicative of a category of requested personal data; and
a fifth signal indicative of a time of day at which the second input was supplied.

11. The system of claim 10, wherein the second input includes each of the first, second, third, fourth, and fifth signals.

12. The system of claim 10, wherein the first input includes at least one of:
a first signal identifying the client device that supplied the second input;
a second signal indicative of a global location from which the second input was supplied;
a third signal indicative of a storage location of requested personal data among the plurality of client data systems;
a fourth signal indicative of a category of requested personal data; and
a fifth signal indicative of a time of day at which the second input was supplied;
wherein the processor is programmed to create the activity model by training a predictive data model using the at least one of the first, second, third, fourth, and fifth signals; and
as a result of the training, outputting a trained classifier that receives as input the second input and that produces as output a prediction of whether second user activity is anomalous.

13. The system of claim 8, wherein the processor is programmed to generate an alert command for causing an output device of the at least one of the client devices to output an alert.

14. The system of claim 8, wherein the processor is programmed to generate a denial command that causes the at least one of the client devices to deny a request associated with the second user activity.

* * * * *